United States Patent [19]

Ouellette, deceased

[11] 3,752,204

[45] Aug. 14, 1973

[54] CABLE TIRE CHAIN TENSIONING AND LOCKING DEVICE

[76] Inventor: Paul Rene Ouellette, deceased, late of P.O. Box 124, Lakewood Dr., Swanton, Vt. 05488 by Yvonne Ouelette, legatee

[22] Filed: Dec. 29, 1971

[21] Appl. No.: 213,500

[52] U.S. Cl............... 152/219, 152/213 A, 152/241
[51] Int. Cl.............................................. B60c 27/10
[58] Field of Search................... 152/219, 213, 225, 152/241

[56] References Cited
UNITED STATES PATENTS 2,767,760  10/1956  Granger........................ 152/213 R
1,455,408  5/1923  Olson................................ 152/225

Primary Examiner—James B. Marbert
Attorney—Raymond A. Robic

[57] ABSTRACT

The disclosure describes a device for tensioning and locking the lateral wire of a cable tire chain comprising at least one abutment element fixed to one end portion of the lateral wire. The device also comprises a retaining member which is fixed at the other end of the lateral wire. The retaining member is formed with an opening through which the abutment element can be inserted, and means by which the abutment element abut the retaining member after the abutment element has been inserted through the opening in order to tension and lock the lateral wire.

3 Claims, 3 Drawing Figures

Patented Aug. 14, 1973 3,752,204

CABLE TIRE CHAIN TENSIONING AND LOCKING DEVICE

This invention relates to a lock. More particularly, the present invention is directed to a cable tire chain tensioning and locking device.

Common tire chains are usually made of arch type portions which cover the sole of the tire. These portions can for example consist of standard chain sections or of other more intricated anti-slipping devices. In all these cases, there must be provided a wire or similar articles which run along the tire walls to hold the tire chains applied against the tire sole. The wire or the like articles must first be tensioned, then locked. However it must be remembered that tire chains are mounted, usually on the rear tires of a car under circumstances which are not ordinary. Usually, this operation takes place during a winter storm with the result that the mounting of tire chains must be fast and easy.

It is an object of the present invention to provide a device by means of which a cable tire chain can easily and efficiently be tensioned and locked.

This invention resides in a device for tensioning and locking the lateral wire of a cable tire chain comprising at least one abutment element fixed to one end portion of the lateral wire. The device also comprises a retaining member which is fixed at the other end of the lateral wire. The retaining member is formed with an opening through which the abutment element can be inserted and means by which the abutment element abut the retaining member after the abutment element has been inserted through the opening in order to tension and lock the lateral wire.

In the drawings which illustrate the invention,

Figure 1:
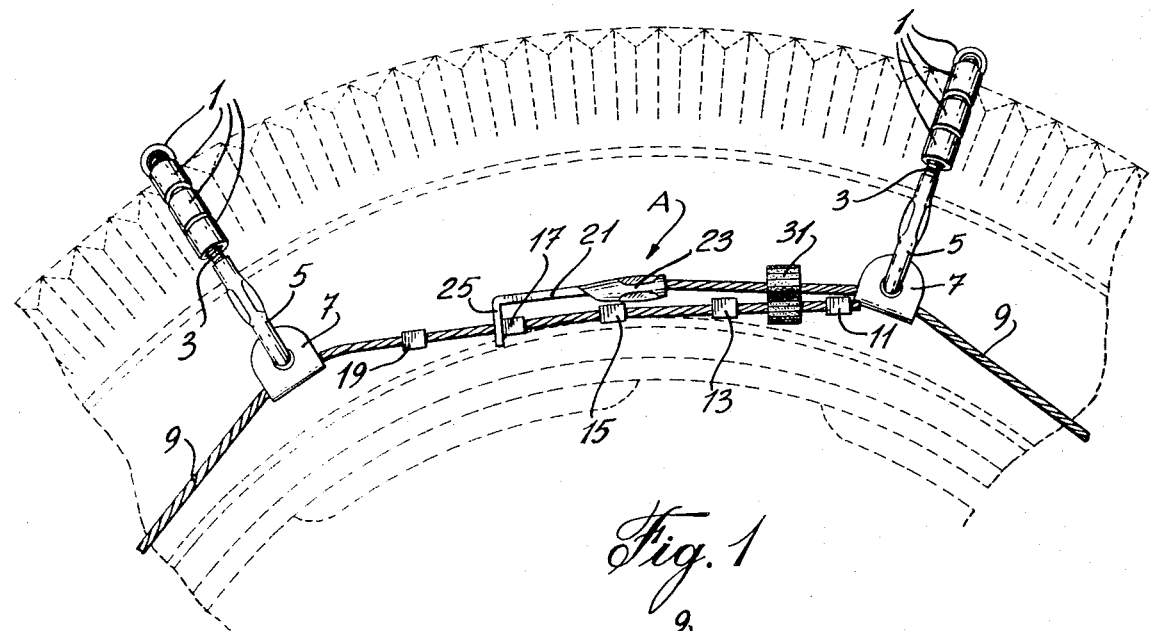
FIG. 1 is a side view of a device according to the invention when the tire chain is being mounted and locked over a tire.

Referring to the drawings, it will be seen that the tensioning and locking device A is illustrated in connection with a tire chain mounted over a tire illustrated in dotted lines in FIG. 1 and which is formed of small metallic cylindrical sections 1 each slidably mounted over a steel cable 3. The latter is terminated by hooks 5, the ends of which are received in hookings members 7 mounted along the lateral wire 9 of the tire chain. The tire chain itself forms no part of the present invention and will therefore not be described in detail.

The tensioning and locking device A, as illustrated in the drawings, comprises five abutment elements 11, 13, 15, 17 and 19 in the form of small prisms which are fixed spaced from one another, at one end portion of the lateral wire 9. The abutment elements can for example be formed of small rectangular metallic pieces which are mounted to surround the lateral wire 9 and are crushed in place to form the above mentioned prisms. In practice, these abutment elements are spaced about 1 inch from one another, starting from near the end of the lateral wire 9.

At the other end of the lateral wire 9, there is affixed a longitudinal retaining member 21. To affix the longitudinal retaining member 21 to the other end of the lateral wire 9, and end 23 of the retaining member 21 is rolled around the corresponding end of the lateral wire 9 where it is crushed to be permanently held thereon.

The end of the retaining member 21 opposite the rolled end 23 is bent to form a 90° angle and will hereinafter be referred to as the bent portion 25 of the retaining member.

Figure 2:
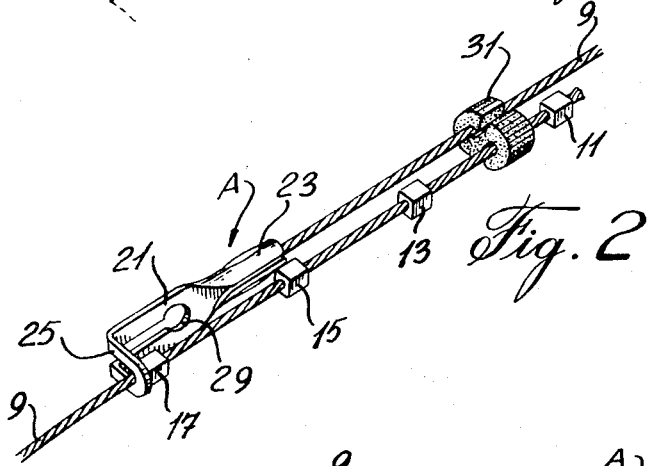
FIG. 2 is a perspective view of the tensioning and locking device illustrated in FIG. 1.
Figure 3:
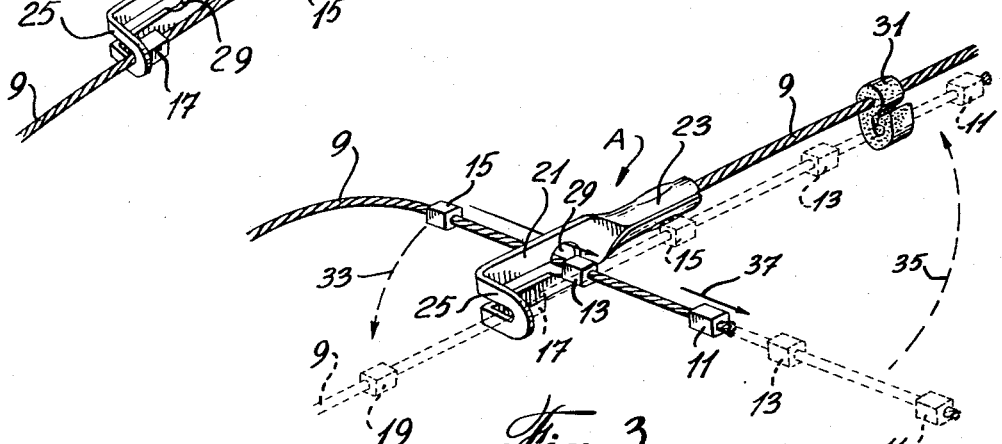
FIG. 3 is a perspective view showing the insertion of the abutment elements in the opening of the retaining member.

The retaining member 21 also comprises a longitudinal slot 27 which is formed in the center of the retaining member and extends from a shorter portion in the bent portion 25 to a longer portion in the straight portion of the retaining member. The slot 27 terminates in the opening 29 which is provided adjacent the rolled end 23 of the retaining member 21. Reference is particularly made to FIGS. 2 and 3 of the drawings.

With respect to the slot 27 it should be pointed out that it must be wide enough to permit the wire 9 to move freely therein while at the same time retaining the metallic abutment elements 11, 13, 15, 17 and 19 when the latter are pulled taut against the shorter portion of the slot. The opening 29 must however be large enough to insert not only the lateral wire 9 but also the abutments elements 11, 13, 15, 17 and 19, therethrough.

The tensioning and locking device A finally comprises an S-shaped holding member 31 which has the particular shape illustrated in FIGS. 2 and 3 and is slidably mounted along the lateral wire 9 close to the retaining member 21 to hold the end of the lateral wire 9 containing the abutment elements 11, 13, 15, 17 and 19 when the device A is in the locked position.

The operation of the tensioning and locking device A of the present invention is better illustrated in FIG. 3 of the drawings. The end of the lateral wire 9 containing the abutment elements 11, 13, 15, 17 and 19 is inserted in the retaining member 21 through the opening 29 until it reaches a point where the lateral wire is under a sufficient tension, for example as illustrated in full lines in FIG. 3 of the drawings. The lateral wire 9 is then moved in the slot 27 in the directions indicated by arrows 33, 35 and 37 until it reaches the position indicated in dotted lines in FIG. 3. The end of the lateral wire 9 containing the abutment elements is then snapped into the S-shaped holding member 31 and we now have an assembly which is locked in plane.

The device is unlocked simply by reversing the above operations.

I claim:

1. A device for tensioning and locking the lateral wire of a cable tire chain comprising a plurality of abutment elements fixed to one end portion of said lateral wire, and a retaining member fixed at the other end of said lateral wire, said retaining member formed with an opening through which said abutment element can be inserted and means by which said abutment element abut said retaining member after said abutment element has been inserted through said opening in order to tension and lock said lateral wire.

2. A device according to claim 1, wherein said retaining member is a longitudinal member having one of its ends rolled around said other end of said lateral wires, said rolled end of said longitudinal member crushed on said lateral wire to be permanently held thereon, said retaining member being bent at its other end to form a 90° angle, said retaining member having a longitudinal slot at its center, said slot extending from a smaller portion in the bent portion to a longer portion in the straight portion of said retaining member and terminating in said opening which is provided adjacent said rolled end, said slot wide enough to receive said wire while retaining said abutment elements when the same are pulled taut against the smaller portion of the slot, said device also comprising an S-shaped holding member slidably mounted along said lateral wire to hold the end of said lateral wire containing said abutment elements.

3. A device for tensioning and locking the lateral wire of a cable tire chain comprising a plurality of metallic abutment elements spacedly fixed to one end portion of said lateral wire, a longitudinal retaining member having one of its ends rolled around said other end of said lateral wire, said rolled end of said longitudinal member crushed on said lateral wire to be permanently held thereon, said retaining member bent at its other end to form a 90° angle, a longitudinal slot in the center of said retaining member, said slot extending from a shorter portion in the bent portion to a longer portion in the straight portion of said retaining member and terminating in an opening which is provided adjacent said rolled end, said opening large enough to insert said abutment elements, said slot to receive said wire while retaining said metallic abutments elements when the same are pulled taut against the shorter portion of the slot, and an S-shaped holding member slidably mounted along said lateral wire to hold the end of said lateral wire containing said abutment elements.

* * * * *